3,331,784
RADIOACTIVE CERAMIC SOURCE OF STRONTI-
UM FLUORAPATITE AND METHOD OF MANU-
FACTURE
Gérard Meyer, Antony, and André Michel, Saint-Maur,
France, assignors to Commissariat à l'Energie Atom-
ique, Paris, France
No Drawing. Filed Oct. 19, 1965, Ser. No. 498,142
Claims priority, application France, Oct. 29, 1964,
993,167, 993,168
3 Claims. (Cl. 252—301.1)

This invention is concerned with a new radioactive ceramic source which can be employed especially as a heat source in an electrical energy generator and with a method for the manufacture of said source.

Among the radioactive sources which are usually employed in generators of this type, there can be mentioned sources having a base of caesium-137 and strontium-90. When strontium-90 is employed, it is usually present in the form of strontium titanate.

This invention has for its object a new radioactive ceramic source containing strontium-90 having a base of sintered strontium fluorapatite corresponding to the formula $[Sr_3(PO_4)_2]_3 \cdot SrF_2$.

The strontium fluorapatite employed can be prepared either by wet process or dry process. The wet process consists in preparing separately strontinum phosphate from strontium chloride and from disodium phosphate, and strontium fluoride from strontium chloride and sodium fluoride; the strontium phosphate and strontium fluoride are then put in suspension in degassed cold water and fluorapatite is formed as a result of reaction between the products in suspension.

The dry process consists in mixing the strontium phosphate and strontium fluoride which are prepared by the methods referred-to above, in crushing the aggregate thus obtained and in calcining this latter at 800° C. in order to form stronium fluorapatite.

In both of these methods, the strontium compound which is employed as starting material is strontium chloride. However, since the most common radioactive strontium compound is strontium carbonate which is obtained as a result of the process of separation of fission products, it is preferable to prepare fluorapatite containing radioactive strontium-90 by making use of the most common radioactive strontium compound as starting material.

To this end, the invention proposes a method of preparation of strontium fluorapatite starting with strontium carbonate which consists in putting strontium carbonate in suspension in water, in precipitating strontinum fluoride by addition of hydrofluoric acid to said suspension, in diluting the solution thus obtained, in introducing phosphoric acid in a quantity which is necessary for the purpose of forming strontium phosphate, in adjusting the pH of the solution by means of an alkaline solution to a value which is sufficient to produce the complete precipitation of the strontium phosphate, in subjecting the strontium fluoride-strontium phosphate mixture thus obtained to filtration and heat treatment at a temperature and for a period of time which are sufficient to result in the formation of strontium fluorapatite.

The two following reactions take place in aqueous medium:

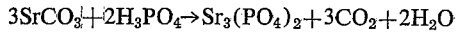

$$SrCO_3 + 2HF \rightarrow SrF_2 + CO_2 + H_2O$$

$$3SrCO_3 + 2H_3PO_4 \rightarrow Sr_3(PO_4)_2 + 3CO_2 + 2H_2O$$

In order to achieve this result, there is initially employed the quantity of strontium carbonate which is necessary for the purpose of producing the desired mass of strontium fluorapatite; said strontium carbonate is put in suspension in the minimum volume of water which is necessary and a hydrofluoric acid solution is added in such a quantity as to obtain the strontium fluoride which is later to form a constituent of the fluorapatite. The strontium carbonate solution which contains the strontium fluoride precipitate is slightly diluted with water and the phosphoric acid is then introduced drop by drop in a quantity which is necessary to produce a reaction with the remaining strontium carbonate.

When the addition of phosphoric acid is completed, the pH value of the solution is adjusted with an alkaline solution to a value which is sufficient to produce the complete precipitation of the strontium phosphate which is formed. Any alkaline solution such as an ammonia solution can be employed for this operation and the quantity added is such that the pH value of the solution becomes higher than 7 and preferably remains in the vicinity of 9.5. This alkalization of the medium must be performed with care in such manner as to prevent the temperature of the solution from rising above 50° C., as this would result in hydrolysis of the strontium phosphate.

There is thus obtained a mixture which consists of strontium fluoride and strontium phosphate and from which the strontium fluorapatite will be obtained; for this purpose, the mixture is filtered and the precipitate is subjected to a calcining process at a temperature within the range 600° C. to 1,000° C. and preferably in the vicinity of 800° C. for a period of time which is sufficient to form the strontium fluorapatite. The calcination temperature must not exceed 1,000° C. since strontium fluoride decomposes above this temperature. The temperature rise can take place abruptly if the operation is performed between 600° C. and 800° C. On the other hand, above 800° C., the temperature rise must be slow in order to prevent decomposition of the strontium fluoride.

By way of example, 147.64 grams of stronium carbonate are put in suspension in 40 cm.³ of cold degassed water; 10 cm.³ of hydrofluoric acid at 21 moles per liter are added until completion of the reaction and, after dilution of the suspension of strontium carbonate and strontium fluoride which is formed by means of 250 cm.³ of water, 69 cm.³ of phosphoric acid at 8.8 moles per liter are introduced drop by drop. The pH value of this acid solution is adjusted to 9.5 by means of a 5 N ammonia solution so as to precipitate the strontium phosphate completely. There is thus obtained a solution containing strontium phosphate and strontium fluoride; this mixture is recovered by filtration and, after a heat treatment at 800° C. as performed for a period of 5 hours, there are obtained 148.4 grams of strontium fluorapatite.

The fluorapatite must be sintered and is accordingly subjected first to a wet crushing process down to a particle size which is less than 50 microns, then to a compacting process under a pressure of the order of 3 t./cm.² and, finally, the product obtained is heated to a temperature comprised between 800° C. and 1,600° C. for a period of the order of 8 to 12 hours.

A number of parameters are taken into account in the sintering process yield, especially the particle size distribution of the powder, the heating temperature and sintering time. The influence of each of these parameters has been studied in order to determine the best sintering conditions.

In the first place, the powder is subjected to a wet crushing process until the particles obtained pass through a 50-micron mesh; should the particle size be larger, then the density obtained will be lower with respect to theoretical density.

By way of example, in the case of a compacting pressure of 3 metric tons per square centimeter and a heat treatment for a period of 12 hours at 1200° C., the sintered powder has a density of 78% of theoretical in the case of a particle size between 80 and 160 microns and a density of 90% of theoretical in the case of a particle size which is smaller than 50 microns.

The product which is thus crushed is shaped by incorporation of an organic binder such as alcohol or camphor, for example, which disappears after the first few minutes of heating, and compaction under a pressure of the order of 3 t./cm.$^2$ for a period of approximately 5 minutes. The pellets obtained are then subjected to a heat treatment at a temperature in the range 800 to 1,600° C. for a period of approximately 10 hours; the density of the product obtained increases with the sintering temperature. By way of example, in the case of a particle size between 37 and 50 microns, 80% of theoretical density is obtained by heating for 12 hours at 800° C. and 90% of theoretical density is obtained by heating for 12 hours at 1,600° C. The times of sintering can vary over a wide range, but sintering times varying between 8 and 12 hours are the most favorable.

The radioactive ceramic source prepared as hereinabove described is then advantageously employed as a heat source in an electrical energy generator which makes use of a system for the direct conversion of heat into electricity; by virtue of its small dimensions, a generator of this type can be advantageously employed in spaceships.

What we claim is:
1. Radioactive ceramic source comprising sintered strontium fluorapatite which corresponds to the formula:

$$[Sr_3^{90}(PO_4)_2]_3 \cdot Sr^{90}F_2$$

2. A method for the manufacture of a radioactive ceramic source comprising sintered strontium fluorapatite of the formula:

$$[Sr_3^{90}(PO_4)_2]_3 \cdot Sr^{90}F_2$$

comprising preparing strontium fluorapatite, wet crushing said strontium fluorapatite until a particle size smaller than 50 microns is obtained, compacting the powder thus obtained under a pressure of 3 t./cm.$^2$ to form pellets and heating the pellets obtained to a temperature in the range of 800° C. to 1600° C. for a period in the order of 8 to 12 hours.

3. Method of manufacture of a radioactive source in accordance with claim 2, characterized in that the preparation of the fluorapatite consists of putting strontium carbonate in suspension in water, in precipitating strontium fluoride by addition of hydrofluoric acid to said suspension, in diluting the solution thus obtained with water, in introducing the phosphoric acid in the quantity which is necessary for the purpose of forming strontium phosphate, in adjusting the pH of the solution by means of an alkaline solution to a value between 7 and 9.5 which is sufficient to produce the complete precipitation of the strontium phosphate, in subjecting the strontium fluoride-strontium phosphate mixture thus obtained to filtration and heat treatment at a temperature between 600 and 1,000° C. for a period of time which is sufficient to result in the formation of strontium fluorapatite.

References Cited

UNITED STATES PATENTS 3,165,475   1/1965   Amos _____ 252—301.1

CARL D. QUARFORTH, *Primary Examiner.*

BENJAMIN R. PADGETT, *Examiner.*

S. J. LECHERT, Jr., *Assistant Examiner.*